Jan. 31, 1967     D. L. FRIED ETAL     3,302,027
INTERFEROMETRIC METHOD AND APPARATUS FOR
MODULATION AND CONTROL OF LIGHT

Filed July 12, 1963     8 Sheets-Sheet 1

INVENTORS
DAVID L. FRIED
WENDELL S. READ
BY
ATTORNEY

Jan. 31, 1967 D. L. FRIED ETAL 3,302,027
INTERFEROMETRIC METHOD AND APPARATUS FOR
MODULATION AND CONTROL OF LIGHT
Filed July 12, 1963 8 Sheets-Sheet 2

INVENTORS
DAVID L. FRIED
WENDELL S. READ
BY
ATTORNEY

INVENTORS
DAVID L. FRIED
WENDELL S. READ
BY
*Allen Rothenberg*
ATTORNEY

INVENTORS
DAVID L. FRIED
WENDELL S. READ
BY
ATTORNEY

United States Patent Office 3,302,027
Patented Jan. 31, 1967

3,302,027
INTERFEROMETRIC METHOD AND APPARATUS FOR MODULATION AND CONTROL OF LIGHT
David L. Fried, Huntington Park, and Wendell S. Read, Los Angeles, Calif., assignors to North American Aviation, Inc.
Filed July 12, 1963, Ser. No. 294,585
22 Claims. (Cl. 250—199)

This invention relates to an improved interferometric system for varying the intensity of a light beam. More particularly, the invention relates to methods and apparatus for controlling the difference between the pathlengths of light passing through two legs of an interferometric system so as to effect constructive and destructive light interference.

There has been a need for a practicable means of utilizing a light beam as a carrier for complex information signals. An obvious advantage of such a communication system is that the signal, unlike an ordinary radio wave, is not simultaneously radiated in more than one direction and consequently cannot be detected by persons not in the path of the beam. By means of the invention disclosed herein a single beam of laser light can be modulated with little power and used to carry an information signal covering a large frequency bandwidth. Furthermore, the principles of the invention can also be employed in an apparatus capable of measuring small displacements with accuracy and convenience not heretofore attained by known interferometric techniques. Because of its great sensitivity in detection of small displacements, the invention can be applied with considerable advantage to apparatus whose sensitivity depends upon the detection of the displacement of a component under the influence of an external force, such apparatus including the microphone, gravitometer, strain gage and seismograph. The principles of the invention can also be used in the construction of a light-chopper or in a means for either varying the intensity of a light beam or controlling the relative intensities of two light beams with respect to each other.

Accordingly, it is a broad object of the invention to control the intensity of electromagnetic energy by employing principles of interferometry. More particularly the invention provides an effective means for controlling the difference between the pathlengths of light passing through two legs of an interferometer system. These objects are accomplished by means of an interferometer system in which, in certain embodiments, the difference between the pathlengths of light passing through the two legs of the system is controlled by impressing two electrical signals, namely, an oscillatory signal and a bias signal, upon solid-state electromechanical transducers that actuate the movement of either one or both of two reflecting mirrors of the system.

As will be explained more fully in the following detailed description, the improved interferometer that comprises the invention can be employed in an information transmitting system by impressing an information or modulating signal upon one or two transducers to differentially and proportionally change the pathlengths of light traveling through the two legs of an interferometer in accordance with said signal, and also by simultaneously impressing a bias signal upon the same or different transducers so that the oscillatory motion of the transducers induced by the modulating signal will occur about a magnitude of pathlength difference that is an odd integral multiple of one-quarter wavelength of the light used as information carrier. The bias signal effects a controlled steady state variation or difference between light pathlengths, in effect establishing an "operating point" about which the modulating signal effects a fluctuating variation of light pathlengths. In communication embodiments of the invention, additional advantages are obtained by impressing the modulating signal upon two transducers in such a way that the light pathlengths are differentially varied in mutually opposite sense, i.e. the light pathlength of one leg of the interferometer system increases as the light pathlength of the other leg decreases, and vice versa, in response to the modulating signal. Major advantages of the invention derive from exceedingly low power requirements and small size and weight.

When the invention is employed in an interferometer adapted for measuring displacement with greater precision than heretofore attained, the aforementioned bias signal again provides an operating point about which another signal causes a fluctuating variation in light pathlengths of the interferometer to occur. However, as will be more fully explained hereinafter, in a displacement measuring embodiment of the invention the bias signal is not used to establish a steady state difference in pathlengths the same as that required for optimal operation of a communications embodiment of the invention, nor are the functions of the bias and oscillatory signals the same for the two systems. For measuring displacement the invention contemplates using the bias signal to effect a steady state pathlength variation that is an integral multiple of one-half wavelength of the light used with the interferometer system, and the oscillatory signal is a signal of constant predetermined amplitude and frequency rather than, as in the case of the information transmitting system, a signal of either variable amplitude or frequency. In the use of the invention for measuring displacement one of the two reflecting mirrors of an interferometer is mounted, as in conventional measuring techniques based on light interference, so that it will undergo the displacement to be measured. Bias and oscillatory signals are then impressed upon either the same or different transducers to establish a mean light pathlength difference that is, as previously stated, an integral multiple of one-half wavelength of the light used. This mean difference is readily obtained by varying the bias signal impressed upon either one or two transducers, and the oscillatory signal will then vary the pathlength difference around the mean value. After this adjustment has been made, the displacement to be measured is allowed to occur. The bias signal is then changed to restore the same condition that existed before the displacement occurred, namely, a mean pathlength difference equal to one-half wavelength of light. As will be shown in the following discussion of the operating principles of the invention, the displacement which occurred can be determined with great precision by the change in bias signal required to restore the initial operation point of the system.

When the invention is used in apparatus adapted to detect a variable external force, such as a microphone for detecting weak sound waves, both bias and oscillatory signals are applied to the same or different transducers in order to establish an operational condition that is analogous to that employed in the above-described displacement measuring application of the invention, namely, the bias signal is used to create a difference in light pathlengths in the interferometer system that is an integral multiple of one-half wavelength of light and the oscillatory signal is used to effect a fluctuating variation of constant predetermined amplitude and frequency about this operating point. However, in the force-detecting form of the invention one of the reflecting mirrors is mounted so as to vibrate under the influence of an external force of varying magnitude. Thus, there are two oscillatory signals involved in the operation of the force detecting embodiment, one of constant amplitude and frequency that actuates one of the reflecting mirrors, and a second of variable amplitude and frequency impressed upon the other reflecting mirrors by the force to be detected. It will be shown in the following detailed description of a preferred force-detecting embodiment of the invention that the oscillatory signal of constant amplitude and frequency impresses a "carrier-wave" intensity fluctuation upon the output light beam of the system, and that the mirror vibration induced by the varying external force modulates this carrier-wave intensity fluctuation. Since the mirror displacement required for generating a detectable signal is very small, the invention provides a highly sensitive force-detecting device.

It is an additional object of the invention to provide an efficient, low power light modulator of small size.

It is another object of the invention to provide a method and apparatus for increasing the precision with which measurement of displacement can be made by an interferometer technique.

An additional object of the invention is detection of the displacement of a body induced by an external force of varying magnitude.

A further object of the invention is to provide a method and apparatus for selectively maintaining the intensity of a light beam at a predetermined level.

Still another object of the invention is to provide a method and apparatus for splitting a light beam into two beams having a predetermined ratio relative to each other.

Another object of the invention is to povide a method and apparatus for pulsing a light beam.

Another object is the transmission of information by means of electromagnetic energy of a frequency in or about the visible spectrum.

Other objects and features of the invention will become apparent from the following description and accompanying drawings wherein.

Throughout the drawings like reference characters refer to like parts.

It is to be understood that the light which is under consideration in the following discussion of the several embodiments of the invention is in all cases monochromatic. In those situations where the invention is employed in a communications system the energy source employed preferably provides a continous electromagnetic energy beam such as the coherent light from a continuous laser which can be formed into a narrow beam capable of being focused on a detector over a great distance. The invention is not necessarily limited to the use of electromagnetic energy in the visible range but extends also to the use of ultraviolet and infrared energy. It should be further understood that the definition of "light pathlength" is not to be restricted to twice the spatial displacement of the reflecting mirrors from the beam-splitter of the interferometer. Persons skilled in the art of optics will recognize that the relative effective light pathlengths of the two legs of an interferometer system can be changed by inserting light transmitting media of different refractive indices between a beam-splitter and mirrors equally spaced therefrom. The relative effective light pathlengths controls, of course, the degree of light interference at the beam-splitter of an interferometer, and consequently when "pathlength" is used in the following description of the invention, the term should be interpreted as including pathlength variation resulting from means other than spatial difference in pathlengths.

Figure 1:
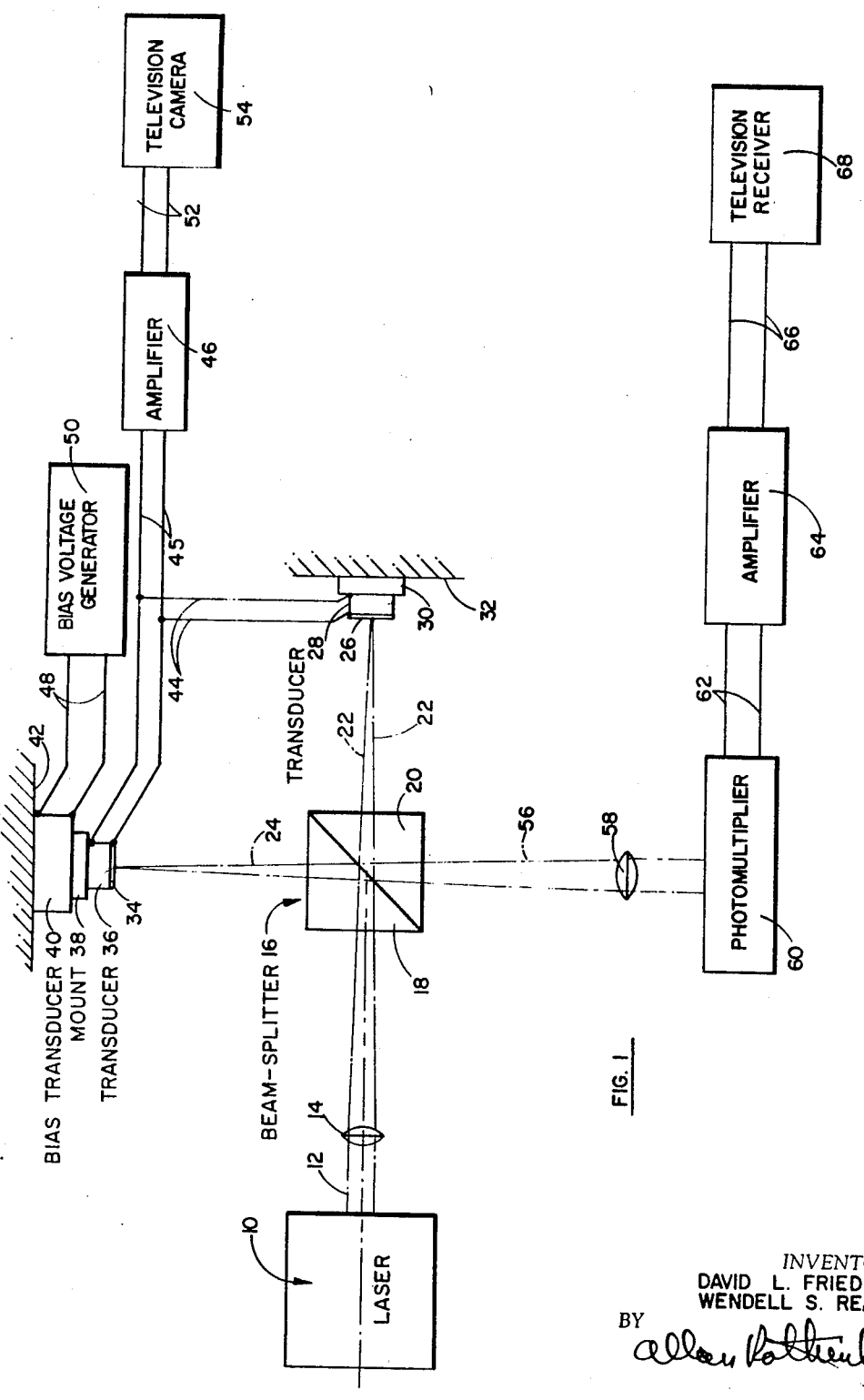
FIG. 1 is a schematic representation of a preferred embodiment of the invention adapted for use as an information transmitting system.

In the communication system illustrated in FIG. 1, a continuous-wave, collimated laser light source 10 produces an input or carrier light beam 12 of unvarying intensity which passes through a focusing lens 14 to a beam-splitter generally designated at 16 and comprised of a pair of glass prisms 18, 20 each of which has two mutually perpendicular faces and a third face disposed at a 45 degree angle relative to these perpendicular faces. A suitable laser light source is a continuous-wave gas laser such as the Model No. 110 manufactured by Perkin-Elmer Spectro-Physics, Inc. This particular laser produces light of a wavelength of 6328 A. Light projected upon the beam-splitter is split into two beams 22, 24 which are of substantially equal intensity, beam 22 passing through prism 20 and beam 24 being reflected in a different direction through prism 18. In other embodiments of the invention which will be described below, a half-silvered glass plate may be used as a beam-splitter. For modulation of light, however, the prism type beam-splitter is preferred since the problems of spherical abberation associated with the use of a silvered glass plate are minimized. A mirror 26 is placed in the path of light beam 22 to reflect it back to the beam-splitter 16. Mirror 26 comprises a thin, polished coating of aluminum that is applied to one face of a solid-state electromechanical transducer 28. Transducer 28 is supported in a resilient mounting member 30 that is in turn fixed to a support member 32. Mounting member 30 comprises an epoxy resin bonded to transducer 28 and support member 32 and preferably has a modulus of elasticity of approximately 10,000 p.s.i. Further details concerning the function and construction of mirror 26, transducer 28, and mounting member 30 will be given below, following an initial description of other components of the system which are identical in design and function.

A second mirror 34 is placed in the path of beam 24 to reflect it back to the beam-splitter, this second mirror also comprising an aluminum coating that is applied to one face of a second solid-state electromechanical transducer 36. Transducer 36 is also supported in a second resilient mounting member 38 formed of the same material used for mounting member 30. However, in the second leg of the interferometer system there is a third solid-state electromechanical transducer 40 that supports mounting member 38 on one of its faces. The second face of transducer 40, hereafter referred to as the bias transducer of the system, is immovably fixed to the surface of a second support member 42. Transducers 28, 36 are electrically connected by means of leads 44, 45 to the output terminals of an amplifier 46, and the bias transducer 40 is connected by means of leads 48 to the output terminals of a bias voltage generator 50, the D.-C. voltage of which is selectively variable. Leads 52 connect the input terminals of the amplifier 46 to the output terminals of a modulating signal source such as a conventional television camera 54 which may provide both video and audio information. Light of unvarying intensity from light source 10 can be modulated by this system to produce an output beam 56 whose intensity is proportional to the modulation signal generated by the television camera 54. This modulated beam is recollimated by lens 58 and directed to a photomultiplier 60 that detects the variation of intensity of the beam and generates an electric signal proportionate thereto.

Leads 62 connect the output terminals of the photomultiplier to the input terminals of an amplifier 64, and leads 66 connect the output terminals of this amplifier to the input terminals of a utilization, demodulating and display device such as a conventional television receiver 68.

Transducers 28, 36, 40 may be any means capable of adequately responding to a signal so as to move the mirrors 26, 34 respectively along the optical paths of beams 22, 24. Transducers 28, 36 respond to the modulation signal generated by the television camera, whereas the bias transducer 40 responds to a bias voltage selected by means of the bias voltage generator to provide a fine adjustment of the points in the path of beam 24 between which mirror 34 vibrates in response to the modulation signal impressed upon transducer 36. If deemed necessary or desirable a coarse adjustment may also be provided as by mounting one of the transducers or its support for motion under control of a mechanical device such as a screw and nut adjusting mechanism (not shown). While transducers such as electrostatic, electromagnetic and magnetostrictive are contemplated, the preferred embodiment of the invention for light modulation employs transducers 28, 36, 40 of a piezoelectric ceramic, namely, lead zirconium titanate.

It is an important feature of the invention that the reflecting mirrors 26, 34 vibrate in mutually opposite sense relation, i.e., in response to the same modulating signal, mirror 26 moves toward the beam-splitter as mirror 34 moves away from it, and vice versa. In the preferred embodiment of the invention this inverse motion of the mirrors is achieved by mounting transducers 28, 36 on their respective supporting surfaces so that when voltage of the same polarity (like phase) is applied to both transducers one will expand and the other will contract. It will be recognized by persons skilled in the art of piezoelectrics that this desired arrangement of transducers 28, 36 can readily be implemented by selection of the direction of polarization of each transducer. Furthermore, it will be understood that transducer vibration in mutually opposite sense relation could also be achieved by mounting transducers 28, 36 so that both expand, or contract, when the voltage of a given polarity is applied across their opposite faces, and then applying voltages of mutually opposite phase relation across opposite faces of these transducers. Since, as previously stated, mirrors 26, 34 are formed of thin aluminum coatings applied to the faces of the transducers 28, 36 these faces are ground flat and optically polished to minimize surface irregularities that would cause scattering of the light rays reflected back to the beam-splitter.

Mirrors 26, 34 may comprise a surface that is highly reflective to light of the wavelength radiated from light source 10. As previously stated, in the perfered light-modulation embodiment of the invention the mirrors comprise aluminum coatings. Since the reflectivity of a particular coating varies for different wave lengths of light, the material used for the mirrors will depend upon the wave length of the light radiated from light source 10. Aluminum is employed in the described embodiment with a laser providing light of 6328 A. wavelength. Mirrors 26, 34 may be comprised of any one of a number of multilayer dielectric coatings which are well-known to persons skilled in the field of optics and which are selectively suitable for reflecting the particular wave-length of light used as the information carrier in the light modulation system. Such multilayer dielectric coatings, as well as the aluminum coatings used in the presently described embodiment of the invention, may be applied to the polished faces of transducers 28, 36 by means of vacuum deposition or other known techniques.

In the preferred embodiment of the invention illustrated in FIG. 1 the mirrors completely cover the faces of the transducers upon which they are mounted. It may be desirable, in this and other embodiments of the invention, to make the diameter of the mirrors smaller than that of the transducers.

In other embodiments of the invention in which the size and mass of the mirrors are not so critical as in the light-modulation embodiment, the mirrors may be thin silvered glass plates cemented to the free faces of the transducers 28, 36, or in some cases, the faces of the transducers may be polished so that they may serve as the reflective surfaces. In the illustrated embodiment, transducers 28, 36 are 0.012 inch in diameter and 0.006 inch thick. Since the size of bias transducer 40 is not of critical importance, it may be larger than transducers 28, 36. The thickness of the aluminum reflective coatings comprising mirrors 26, 34 is 1500 A.

It will be seen in FIG. 1 that the arrangement of the circuit connecting transducers 28, 36 to the amplifier 46 is such that the voltage impressed across opposite faces of transducer 28 is equal to and in phase with the voltage impressed across the opposite faces of transducer 36. It was pointed out above that transducers 28, 36 are mounted on their respective supporting surfaces so that when the same voltage is applied to both transducers one will expand and the other will contract. When an information bearing signal from the television camera 54 is impressed upon the input terminals of the amplifier 46, producing an output voltage from the amplifier which forms the modulating signal, the free faces of transducers 28, 36 and the mirrors will vibrate in mutually opposite directions along the paths of light beams 22, 24. It will be recognized that constructive interference, or reinforcement, will occur if the light waves of beams 22, 24 are reflected back to the beam-splitter so that they arrive in phase agreement at its interfacial plane (i.e., the plane where recombination of the light waves occurs), and that destructive interference, or cancellation, will occur if the waves arrive in phase opposition at this plane. The degree of light interference will, of course, depend upon the difference between the pathlengths of beams 22, 24 in the two legs of the interferometer system. As shown above, the modulation signal impressed upon the input terminals of the amplifier 46 varies the distances between the beam-splitter and mirrors 26, 34, thus forming an output beam 56 whose intensity is modulated by the modulating signal which effects mutually opposite sense variation of the two path lengths. Since the light rays in beam 56 are diverging, the recollimating lens 58 is placed in their path to form them into a parallel beam that can be projected over a distance to the photomultiplier 60, which generates an electric signal proportional to the intensity of the beam. This signal is amplified by amplifier 64 to the voltage level required for operation of the television receiver 68.

The above-described embodiment of the invention provides several important advantages in a light modulation system, one of which relates to the movement that the transducers are required to undergo in order to modulate the intensity of the output beam 56. If the mirror in one leg of the interferometer were mounted a fixed distance from the beam-splitter 16 and the difference between pathlengths of the light traveling through the two legs of interferometer varied only by vibrating the mirror in the other leg, then in order to achieve 100 percent modulation, i.e., modulation that produces both complete reinforcement and complete cancellation between the light waves which recombine at the beam-splitter, the total movement of the single vibrating mirror would have to equal at least one-quarter of the wave length of the light comprising the signal carrier. At resonance frequency a particular transducer may be capable of a displacement of this magnitude. However, if modulation is to be achieved over a large frequency bandwidth, as will be desired in transmitting a multiplicity of signals on a single carrier beam, the voltage which must be impressed across the faces of the transducer to effect the required displacement may be excessive at frequencies that are considerably higher or lower than the resonance frequency of the transducer. Known non-linearities of the transducer displacement with amplitude or frequency of driving signal may be compensated by use of attenuators or other shaping circuits having a response that compensates for such non-linearities. Nevertheless, these problems are greatly minimized and operating ranges concomitantly increased by use of transducers driven in opposite sense. It will be readily seen that in accordance with the present invention the use of two transducers, each vibrating in mutually opposite phase relation, provides a means of obtaining 100 percent modulation with a displacement of one-eighth wave length in each transducer, or one-half the displacement which the transducer must undergo in an interferometer having only one vibrating mirror. Obviously the voltage required to drive each of the transducers in the preferred embodiment of the invention will be considerably less than that required if only one mirror is used for modulating the light passing through the interferometer, and this will be true, of course, even if modulation is to be less than 100 percent, which is considered here only for the purpose of explanation of this advantage of the invention.

Other important advantages in light modulation are achieved through the use of lens 14, which focuses the input light beam 12 through the beam-splitter 16 on the mirrors 26 and 34, and the lens 58, which recollimates the light waves emerging from the beam-splitter. It should be noted that the advantages resulting from the use of these lenses may also be obtained if they are located in the optical paths between the beam-splitter 16 and mirrors 26, 34 rather than as shown in FIG. 1. For several reasons the size of the transistors 28, 36 is a critical parameter in an optical modulation system of the type considered herein. Because of physical characteristics of piezoelectric crystals, it is desirable to make both the thickness and diameter of transducers 28, 36 small in order to make their fundamental resonance frequencies high and thus provide for high frequency operation of the modulating system, which in turn increases the capability of a communication system in respect to its signal carrying capacity. Preferably modulation frequencies are below transducer resonant frequencies. There are several ways in which these transducers can oscillate. One, the so-called "piston" mode involves movement of the faces of the transducers toward and away from each other. The resonance frequency of this mode depends upon the thickness of the transducers. A "radial" mode of oscillation of the transducers involves movement of the edges of the transducers radially in and out. The resonance frequency of this mode depends upon the diameter of the transducers.

To obtain the high resonance frequency that is desired for operation of the system, the diameter of the transducers, as well as their thickness, should be small. Furthermore, since power dissipation in a vibrating solid-state electromechanical transducer is directly proportional to the capacitance of the transducer, which in turn is proportional to the area of the transducer, it is desirable to minimize power requirements of the system by making the diameter of the transducers as small as possible. Another advantage of using lens 14 to reduce the size of the transducers (and concomitantly the size of the mirrors) is that it is easier to obtain the required optical flatness of the mirrors if their size is decreased. The lens 14 is therefore placed in the path of beam 12 to focus the light waves thereof on mirrors 26, 34 and thus reduce the required size of these mirrors and the transducers on which they are mounted. Lens 58 must then be used to recollimate light emanating from the interferometric system so that it can be focused on the photomultiplier 60.

The described bias transducer 40 also provides another important improvement in a light modulating system. To obtain linear modulation of the carrier light beam, i.e., modulation that impresses the signal from the television camera 54 upon the carrier light beam without distortion, the average intensity of output beam 56 should be adjusted so that it is midway between the minimum and maximum intensities that can be obtained through varying the voltage level of the bias voltage generator 50. The effect of variation of the bias voltage can readily be understood by reference to FIG. 2, in which curve 70 represents a graph of the variation of intensity of output beam 56 associated with variation of the difference between pathlengths of beams 22, 24. It will be recognized that a sufficient displacement of the free face of transducer 40 (and consequently mirror 34) will vary the intensity of beam 56 so that curve 70 will include a number of minimum and maximum points, the intensity of beam 56 at minimum points being substantially zero (recombination of light waves at the beam-splitter in 180 degree phase opposition and therefore substantially no light output in the direction of beam 56) or at maximum points a certain maximum intensity (recombination of light waves at the beam-splitter in phase.) The distance between adjacent peaks of curve 70 represents a combined displacement of the mirrors 26, 34 equal to one-half of a wavelength ($\lambda$) of the light used as the signal carrier, and a difference between pathlengths of beams 22, 24 (total distance light travels) equal to $\lambda$. By means of the bias voltage, mirror 34 can be moved to a point along the path of beam 24 at which the intensity of beam 56 will be the intensity of a point $a$ in FIG. 2. At this intensity the difference between the pathlengths of the beams is that of point $a'$ of the graph. When a modulation signal from television camera 54 (amplified by amplifier 46) is impressed across the faces of transducers 28, 36, the difference between the pathlengths of the beams will vary, as an illustration, between points $b'$ and $c'$, thereby causing a variation of the intensity of beam 56 between the intensities at points $b$ and $c$. The coordinate points $a$–$a'$, $b$–$b'$ and $c$–$c'$ are located along a substantially linear portion of curve 70, and therefore the variation of the intensity of beam 56 in response to the impressed modulation signal from the television camera will be substantially free of distortion. Obviously if intensity variation occurs over a nonlinear portion of curve 70, or around either a peak or valley of the curve, there will be distortion of the impressed signal. For optimal operation the peak to peak magnitude of the modulating signal is not sufficient to cause operation at either the maximum or minimum peak of curve 70 and the bias voltage is adjusted to provide an "operating point" midway between these peaks, namely at a differential pathlength that is an odd integral multiple of $\lambda/4$. The peaks are indicated by minimum and maximum intensities that can be obtained through varying the voltage level of the bias voltage generator 50. The optimal operating point, represented as $a$ in FIGURE 2, can be obtained by changing the bias voltage so as to displace mirror 34 along the path of beam 24 until the intensity of beam 56 is at a maximum. The bias voltage should then be changed by an amount (in accordance with the equation given below) that will cause a further displacement of mirror 34 equal to one-eighth of a wavelength of the light used as the signal carrier. This will effect a change in the difference between pathlengths of beams 22, 24 equal to one-quarter of a wavelength of the light used, and place the average intensity of beam 56 midway between minimum and maximum points on curve 70. Displacement of the free face of the bias transducer will be in accordance with the following equation:

$$d = K\Delta V$$

where
$d$ = displacement of the free face of transducer 40
$K$ = piezoelectric constant of transducer 40
$\Delta V$ = change of bias voltage Therefore, the optimal operating point for the system can be obtained by adjusting the bias voltage so as to obtain either extinguishment or maximal brightness of beam 56 and then changing the bias voltage to attain a further displacement of mirror 34 equal to one-eighth of the wavelength of light used, in accordance with the given formula. The operating point is thus set by adjusting the difference in path lengths to an odd integral multiple of one-quarter of the wavelength of the monochromatic source. The optimal operation point can also easily be obtained by determining the bias voltages that yield minimal and maximal intensities of beam 56 and then impressing the average of these voltages upon the bias transducer 40. Of course, the modulation signal that is then applied to transducers 28, 36 must not be so large that variation of intensity will occur beyond the linear portion of curve 70. When the system is in operation, proper operation of the system can be achieved by adjusting either or both the bias voltage level and modulation voltage strength so as to eliminate any observable distortion of the signal.

An additional advantage of the described system lies in the mounting arrangement of transducers 28, 36 in resilient mounting members 30, 38 respectively. If transducer 28 were mounted directly upon support member 32 and transducer 36 directly upon the free face of transducer 40, part of the vibrational energy imparted to these transducers by a high frequency modulation signal would be dissipated in support member 32 and, by transfer through transducer 40, support member 42. It is obvious that supports 32 and 42 must be fixed relative to each other. Support members 32, 42 are preferably a part of a rigid box-shaped casing (not shown) that surrounds the beam-splitter 13 and holds it and the other interferometer components in the required spatial relation. The transducer-mirror units, beam-splitter and lenses are conveniently mounted on mutually perpendicular walls of this casing. The natural frequency of support members 32, 42, or of these members and a casing, depends, of course, upon the physical properties of these bodies but, even for external case dimensions of two inches or less, will be much lower than the frequency of the modulation signal. If sufficient energy from the modulation signal reaches support members 32, 42 or these members and a casing associated therewith, they will vibrate at their natural frequency, and such vibration will in turn affect the movement of mirrors 26, 34 and cause distortion in the information signal impressed upon output beam 56. This undesirable condition of operation is obviated by interposing resilient mounting member 30 between transducer 28 and support member 32, and resilient mounting member 38 between transducers 36 and 40. The vibrational characteristics, compliance inertial and damping ratio of the resilient mounting members are such as to block the mechanical transfer of vibrational energy to or from the transducers. For the sake of simplicity, no resilient mounting members are shown in the construction of other embodiments of the invention that will be described hereinafter. It is to be understood that such members can be used with any of the described systems where transfer of vibrational energy creates undesirable resonance of supports or other appurtenant components.

A system constructed and operated in accordance with the above-cited principles and used to transmit television signal employs a laser light beam produced by a helium-neon gas laser Model No. 110 manufactured by Perkin-Elmer, Spectro-Physics, Inc. This system, requiring only two watts of power, has a 1.7 megacycle bandwidth at 40% modulation (i.e., modulation which varies the intensity of the carrier beam over 40% of the range of minimal and maximal intensities that could be obtained with 180 degree phase shift in light interference). One of the principal advantages of the light modulator is its suitability for use aboard spacecraft. Use of the system as a communications link between an earth monitoring station and the moon or a spacecraft on a planetary mission will require transmitter and receiver lenses of small to moderate size, eliminating bulky antennas of conventional communications systems. Furthermore, because laser light can be formed into a narrow beam that will concentrate energy on a relatively small area at a great distance, the power requirements for a communications system based on the invention will be considerably lower than for conventional radio communication, wherein power must be large because radio beams spread rapidly after leaving the transmitter.

While the description above has been directed toward amplitude or intensity modulation, it will be appreciated that the described apparatus is readily adapted to provide phase modulation or combined phase and amplitude modulation. For example, if one mirror is blocked optically and the other driven by a modulating signal the output beam will be phase modulated by the modulating signal. Alternatively, with all optical paths unblocked, and only one of the two transducers driven by the modulating signal, the output beam is modulated in both amplitude and phase.

Figure 2:
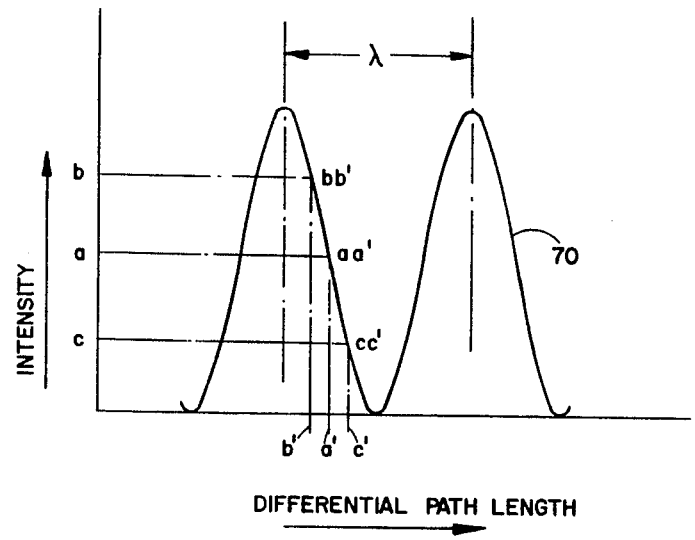
FIG. 2 is a graph illustrating operative features of the embodiment of the invention illustrated in FIG. 1.

It will be readily perceived that the embodiment of the invention illustrated in FIG. 1 can be used as a light-chopper, or light-pulser, if the bias voltage impressed upon transducer 40 and the oscillatory signal impressed upon transducers 28, 36 are adjusted so that the intensity fluctuation of the output beam 56 occurs above a minimum point of the curve 70 of FIG. 2. Pulse frequency may be conveniently controlled by the frequency of the signal impressed upon transducers 28, 36. Since the size of transducers will probably not be so critical for a light-chopper or pulser as for an information transmitting system, the construction of the former may be simplified by having a fixed mirror in one leg of the interferometer and obtaining light path length variation by means of bias and oscillatory transducers in the second leg, or a single transducer in the second leg upon which both bias and oscillatory signals are impressed.

The embodiment illustrated in FIG. 1 can also be used for selectively maintaining the intensity of a light beam at a predetermined level or splitting a light beam into two beams having a predetermined ratio relative to each other. Light which enters the interferometer will either emerge in beam 56 or in a second beam that passes out of the beam-splitter 16 in the direction of the light source 10. The direction of the second beam depends upon the angle of projection of beam 12 upon the beam-splitter. If the angle of projection of the beam upon the beam-splitter is not 90° relative to the outer face of prism 18 (or 45° relative to the plane where light interference occurs), light that does not emerge from the face of the beam-splitting cube adjacent the lens 58 will pass out of prism 18 in a direction not coincident with the input light beam. Therefore, the amount of light passing in each of two directions can be conveniently controlled through selecting the difference in pathlengths of the two legs of the interferometer by means of the bias voltage impressed upon transducer 40. If the two output beams are to be maintained at a steady intensity, no oscillatory signal will, of course, be impressed upon transducers 28, 36.

Figure 3:
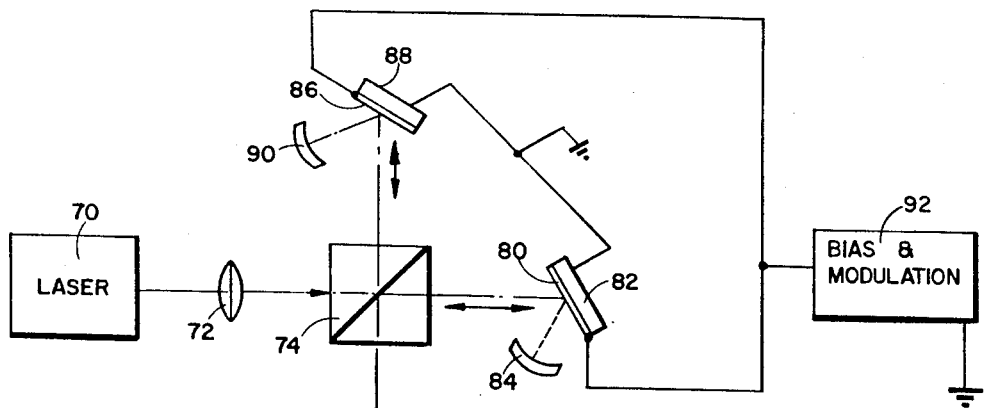
FIGS. 3 and 3a are schematic representations of other embodiments of the invention adapted for use as an information transmitting system.

Primary considerations in a modulator concern bandwidth, largely determined by upper frequency limit, and power requirements, depend to a large etxent upon the magnitude of displacement required of the reflective surface. The latter is closely inter-related with percentage of modulation that is available. It will be readily appreciated therefore that factors tending to assist in obtaining the high frequencies, namely small transducer size, are not compatible with large displacement. Further the need for lowering power requirements is implemented by minimizing displacement of the reflective surface. It is found that both high frequency improvements and maximum displacement with minimum power can be achieved by novel means for increasing the path length variation obtainable for a given energy input. Such an arrangement is illustrated in FIG. 3 wherein a modulator substantially similar to that illustrated in previous embodiments is shown as comprising an interferometer assembly receiving light from a laser 70 and through a focusing lens 72. A beam splitting cube 74 directs the beam along paths of differentially variable length and effects recombination for transmission through output lens 76 to a receiver 78.

In this embodiment at least one interferometer leg includes several path sections of which at least two sections are variable by displacement of a single mirror. Light transmitted through the beam splitting cube 74 is transmitted to a reflective surface or primary mirror 80 carried by a securely mounted piezoelectric crystal 82. The crystal 82 and its mirror 80 are mounted obliquely with respect to the direction of the section of the path of light between the crystal and the beam-splitting cube so that light is reflected from the mirror 80, not directly back to the cube, but obliquely along a second path section to a concave fixedly mounted auxiliary mirror 84. The latter is arranged and positioned to reflect the beam portion received from mirror 80 directly back to and focused on the mirror 80 from whence the light is reflected along the first path section between the beam-splitting cube 74 and the mirror 80 and thence to the output of the modulator.

Similarly in the second leg of the interferometer, the incoming light from the beam splitting cube 74 is directed to an obliquely mounted primary mirror 86 carried by a securely mounted piezoelectric crystal 88. Light striking the mirror 86 is reflected to a firmly mounted concave auxiliary mirror 90 and reflected thereby directly back to the mirror 86 and thence along the optical path between the mirror 86 and the beam splitting cube 74.

Bias and modulating signals are combined as indicated at 92 and fed to both piezoelectric crystals to effect mutually opposite sense displacement of the crystals as the combined bias and modulating signals vary in intensity of voltage. It will be seen that the variation in path length due to a given displacement of the primary mirror 80 or of the primary mirror 86 is substantially doubled by the provision of the auxiliary mirror 84 or the auxiliary mirror 90. For example, application of a voltage to crystal 82 such as to create expansion of the crystal and motion of the primary mirror 80 toward the beam splitting cube will decrease the length of the optical path section between mirror 80 and cube 74 by an amount equal to substantially twice the primary mirror displacement. At the same time such mirror displacement will also decrease the length of the optical path section between mirror 80 and auxiliary mirror 84 by an amount substantially equal to twice the displacement. The same is true, of course, for the arrangement of mirrors 86 and 90. It will be readily appreciated that the amount of angulation of the mirrors 80 and 86 is greatly exaggerated in the illustration whereby for practical effect the angle between the two sections of the light path will not be great enough to introduce non-linearities of significance.

Figure 3A:
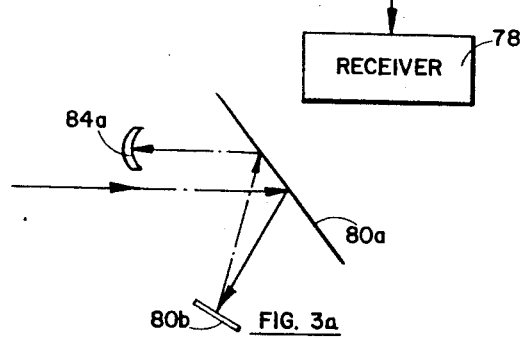

In the embodiment illustrated in FIG. 3 both transducers are driven in mutually opposite directions by both bias and modulation signals. In this embodiment, this is achieved by mounting the transducers with opposite piezoelectric polarities. As described in the discussion of the first embodiment of the invention, the same result can be obtained with an arrangement in which the transducers are mounted so that their piezoelectric polarities are the same but the transducers are driven by mutually opposite voltages. It will be readily appreciated that the concept of a dual section path as shown in FIG. 3 may be extended to provide a path of more than two sections by the use of more than one auxiliary mirror in one or both legs of the interferometer. Further, a second auxiliary mirror may also be transducer driven with bias or modulating signal or both to obtain still greater variation of path length for a given voltage. One leg of an interferometer arrangement having three path sections is shown in FIG. 3a.

The beam may be first reflected from the primary mirror 80a to a first fixed auxiliary mirror 80b that reflects to the primary so as to effect a second reflection from the primary to a second fixed concave auxiliary mirror 84a. The latter is arranged to reflect back to the primary mirror, thence back to the first auxiliary mirror which reflects to the primary for a third reflection along the path section to the beam-splitting cube.

Figure 4:
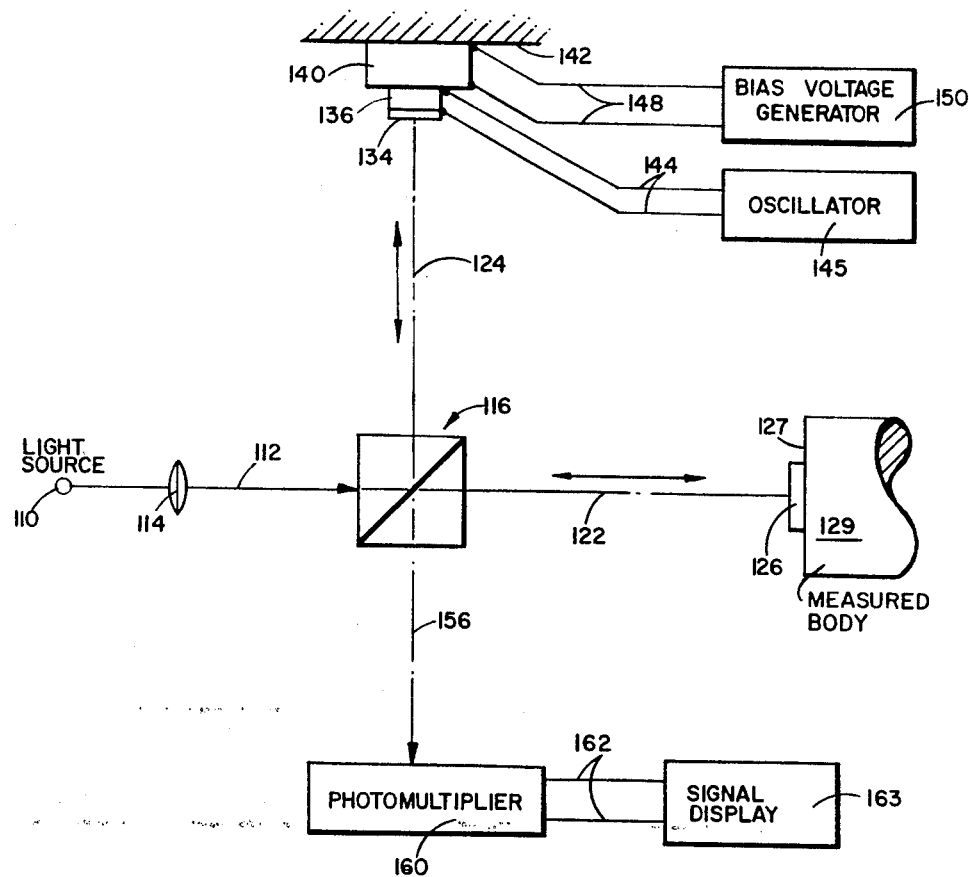
FIG. 4 is a schematic representation of a third embodiment of the invention adapted for use in measuring small displacements.

It was previously stated that the principles of the invention can be employed in a method and apparatus for measuring displacement with a greater precision than heretofore attained with conventional light interferometer means. FIG. 4 illustrates a second embodiment of the invention which is similar in construction to the first embodiment but adapted for precision measurement. A monochromatic light source 110 produces light which is focused into a beam 112 by means of lens 114. This beam is divided by a double-prism type beam-splitter generally designated at 116 into two beams 122, 124 that respectively pass to reflecting mirrors 126, 134 and back to the beam-splitter where either constructive or destructive interference occurs between the light waves of the beams depending upon the positions of the mirrors. Mirror 126 may be any optically flat surface that is capable of reflecting the light of the wave length used in the system. As represented in FIG. 4, mirror 126 is a silvered glass plate attached by suitable means, such as cement, to a surface 127 of a body 129 whose displacement is to be measured. If surface 127 is sufficiently flat and reflective, there is no need for mirror 126 since the surface itself can serve as the reflecting mirror in this leg of the interferometric system. Mirror 134 comprises a thin coating of aluminum applied to one face of a transducer 136, the second face of this transducer being attached to a face of a second transducers 140, hereafter referred to as the bias transducer. The second face of transducer 140 is immovably fixed to a support member 142. Both of the transducers 136, 140, in this exemplary embodiment, are formed of the piezoelectric ceramic, lead zirconium titanate, with the face of transducer 136 adjacent mirror 134 being ground flat and optically polished to provide a suitable base surface for the aluminum reflective coating forming the mirror. Leads 144 connect opposite faces of transducer 136 to the output terminals of an oscillator 145 that generates a sinusoidal signal having a frequency of six kilocycles per second, for example, and leads 148 connect opposite faces of transducer 140 to the output terminals of a bias voltage generator 150, the D.-C. output voltage of which is variable. The output beam 156, comprises the combination of beams 122 and 124, is projected to a photomultiplier 160 that detects the variation in the intensity of the beam and generating an electric signal proportional thereto. Leads 162 connect the output terminals of the photomultiplier to the input terminals of a display device 163, such as, for example, an oscilloscope or harmonic analyzer. Preferably the display device includes a phase discriminator having a reference frequency input from the oscillator 145 and providing a D.-C. output that has a polarity according to the phase of any fundamental (6 kc.) input relative to the 6 kc. reference and a magnitude according to the magnitude of the fundamental input. As will be described below, measurement with the invention involves manual or automatic adjustment to minimize this fundamental.

Figure 5:
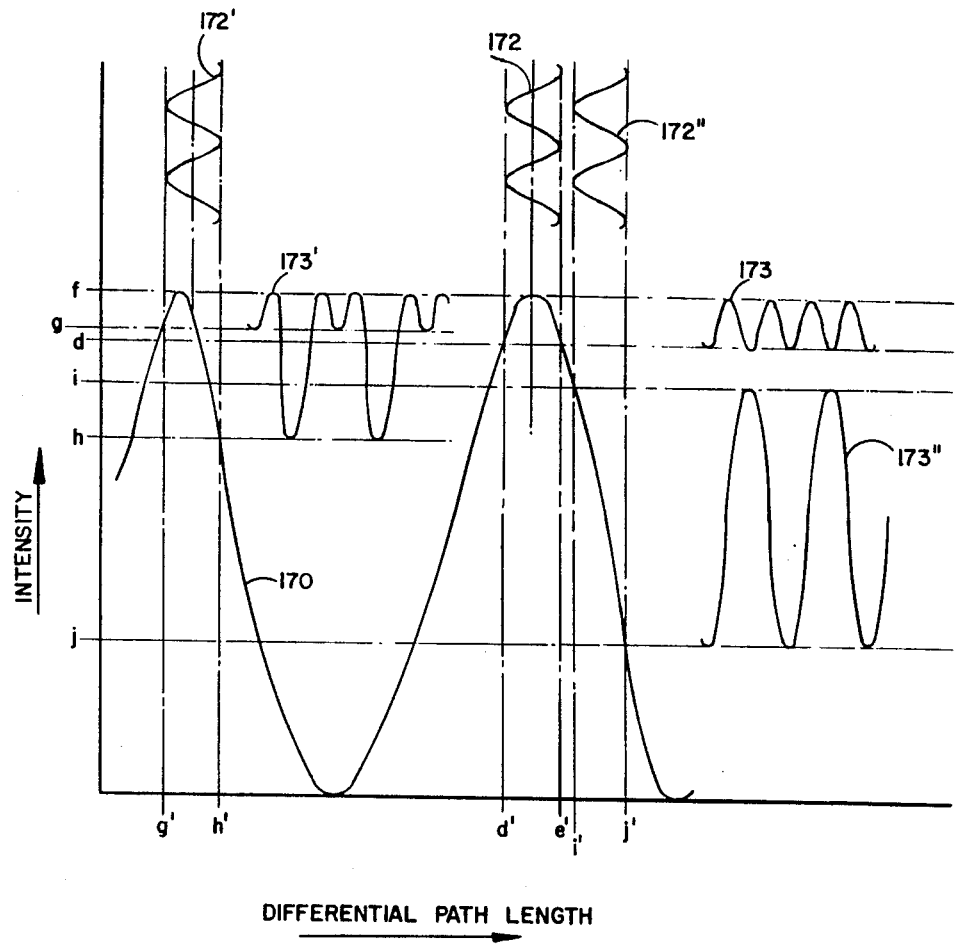
FIGS. 5 and 6 are graphs that illustrate operative featores of the invention as applied to measurement of small displacements.

From the foregoing discussion of the operating principles of the light modulation embodiment of the invention, it will be readily understood that when a driving signal of a predetermined frequency is impressed across opposite faces of transducer 136 by means of the oscillator 145, the resulting vibration of the transducer will alternately move mirror 134 towards and away from the beam-splitter 116, thereby changing the relative effective pathlengths of light traveling through the two legs of the interferometer and causing varying degrees of interference between the light waves arriving at the beam-splitter. This fluctuation of the relative effective pathlengths of beams 122, 124 will effect a fluctuation in the intensity of the output beam 156 formed by the recombination of these beams at the beam-splitter. However, the frequency of the intensity fluctuation of beam 156 can be either the same frequency as the driving frequency, or a second harmonic of this frequency. This operative factor, which is of particular importance with respect to the increase in measuring precision that can be obtained through application of the principles of the invention, can be best understood by reference to FIG. 5, in which curve 170 represents a graph of the variation of the intensity of beam 156 associated with variation of the difference between pathlengths of beams 122, 124. In FIG. 5 curves 172, 172′ and 172″ represent in schematic form the time, frequency and amplitude relationship of a sinusoidal modulation signal of 6 kilocycles per second impressed upon transducer 136 by means of oscillator 145. Through variation of the bias voltage impressed upon the bias transducer 140 by means of the bias voltage generator 150, it is possible to select, over a comparatively large range, the points on the path of beam 124 between which mirror 134 will oscillate in response to the 6 kilocycle oscillatory signal. While the modulation system previously described employs a bias to produce an operating point at a differential path length of an odd integral multiple of one-quarter wave length, the measurement technique employs a bias to produce an operating point at a differential path length of any integral multiple of one-half wave length. As will become evident in the following discussion, the ability to detect this one-half wave length operating point permits measurement and displacement detection to hitherto unavailable orders of precision. Oscillation of mirror 134 will vary the difference between the path lengths of beams 122, 124, and selection of the points along the path of beam 124 between which this oscillation of mirror 134 occurs will determine the points on curve 170 between which the system will be operated. As illustrated in FIG. 5, a bias voltage can be applied to the bias transducer so as to cause mirror 134 to vibrate, in response to an oscillatory signal, between points on the path of beam 124 which vary the difference between path lengths of beams 122, 124 between points $d'$ and $e'$, yielding an intensity fluctuation of beam 156 between points $d$ and $f$. It will be noted that under this condition of operation the frequency of the intensity fluctuation of beam 156, which is detected by a photomultiplier 160 and observable at the signal display device 163, is twice the frequency of the oscillatory signal from the oscillator 145, namely, 12 kilocycles per second rather than 6. In other words the output is the second harmonic of the input frequency and none of the fundamental appears in the output. In FIG. 5 curve 173 represents in schematic form the time, frequency and amplitude relationship of the beam 156 intensity fluctuation when the path length difference between beams 122, 124 varies between points $d'$ and $e'$. If the bias voltage is not adjusted so as to yield a mean path length difference between 122, 124 that is an exact multiple of a one-half wave length of light, the intensity fluctuation of beam 156, as observed at the signal display device 163, will not be symmetrical. Curve 172 of FIG. 5 represents an adjustment of bias voltage such that the path length difference between beams 122, 124 is exactly a one-half wave length of the light used. As previously stated, with this adjustment of bias voltage the intensity of beam 156 fluctuates between the intensity represented at point $f$ and the intensity represented at point $d$. However, if the same 6 kilocycles oscillatory signal is applied to transducer 136 but the bias voltage is adjusted so that the path length difference between beams 122, 124 varies between points $g'$ and $h'$, the intensity of beam 156 will still fluctuate at a frequency twice that of the impressed oscillatory signal, namely, 12 kilocycles per second, but the intensity fluctuation will now occur between the intensity represented at point $f$ and two different intensities represented at points $g$ and $h$. Under this condition of operation the intensity fluctuation of beam 156 is represented by curve 173′. It will be evident that the intensity fluctuation of beam 156 is asymmetric when the bias voltage is adjusted so that the mean path length difference between beams 122, 124 is almost but not exactly one-half wave length of light. The curve 173′ contains a component of the fundamental frequency. It is possible, therefore, to obtain a mean path length difference between beams 122, 124 that is substantially an exact multiple of one-half wave length of light by observing the wave form of the beam 156 intensity fluctuation signal at the display device 163. The bias voltage can also be changed so that the 6 kilocycle signal impressed upon transducer 134 will cause the path length difference between beams 122, 124 to vary between points $i'$ and $j'$. Under this condition of operation the intensity of beam 156 varies between points $i$ and $j$ at the fundamental frequency, namely 6 kilocycles per second. The intensity fluctuation of beam 156 is in this case represented by curve 173″.

By conventional and well-known techniques, displacements of small magnitude are determined by detection of the integral number of interference fringes, corresponding to maximum or minimum points of intensity on curve 170, that sweep past the cross hair of a telescope that is used to view the projected image of the output beam of the interferometer. Known interferometer measuring techniques have attempted to increase the accuracy of this fringe counting method by visual observation of the distance between interference fringes and interpolation of a displacement that shifts a fringe through only a portion of this distance. However, even with highly refined and difficult optical techniques it is impossible, by use of the fringe observation method, to determine displacement with accuracy greater than about $\frac{1}{200}$ of a wave length of light. In contrast with such techniques, the present invention does not depend upon visual observation of the distance between light interference fringes for determination of displacement. In carrying out a measurement according to the principles of the invention, a body 129 whose displacement is to be measured is placed in the path of beam 122 so that its surface 127 and the mirror 126 are at a right angle thereto. An oscillatory driving signal of a predetermined (fundamental) frequency, such as six kilocycle per second, is then applied to transducer 136 by means of oscillator 145. The bias voltage applied to the bias transducer 140 by means of the bias voltage generator 150 is next adjusted so that the mean difference between the pathlengths of beams 122, 124 is an integral multiple of a quarter wavelength of the light used in the system, as determined by observing at the signal display device 163 an intensity fluctuation of beam 156 which is a second harmonic of the frequency of the driving signal and which contains a minimum fundamental component, as detected by the phase discriminator described above. It should be understood that the desired adjustment may be obtained at either a maximum or minimum point of intensity of beam 156. The body 129 is then allowed to move through whatever displacement is to be measured. The bias voltage is again adjusted so that the intensity fluctuation of beam 156, as observed at the signal display device 163, is a second harmonic of the frequency of the driving signal and the phase discriminator shows no fundamental component. If the initial operating point was selected so that the intensity of beam 156 fluctuated about a point of maximum intensity, the bias voltage should be adjusted so that intensity fluctuation again occurs about a point of maximum intensity. The reverse is true, of course, if the initial operating point was on a point of minimum beam intensity. The distance that the free face of the bias transducer (and consequently mirror 134) moved when the bias voltage was changed will be given by the same equation mentioned above, $d = K\Delta V$, where K is, of course, the piezoelectric constant of the bias transducer 140 and $\Delta V$ is the change of bias voltage required to restore the intensity fluctuation frequency of beam 156 to a symmetrical second harmonic of the driving frequency. Since a displacement of $d$ is required to restore the condition that existed before the body 129 was displaced, the displacement of said body is also equal to $d$.

It will be seen that the above explanation of the use of the invention in measuring displacement is sufficient only if the measured displacement is less than one-quarter of the wavelength of light passed through the interferometer system. Measurement of a greater displacement must take into account the fact that a second harmonic of the frequency of the driving signal applied to transducer 136 can be obtained whenever the pathlengths of beam 122, 124 differ by an integral multiple of one-half wavelength of the light used. This operative factor of the invention can readily be appreciated by reference to FIG. 6, in which curve 180 is a graph of the intensity of beam 156 associated with variation of the difference between pathlengths of beams 122, 124 of FIG. 4. Point $k'$ represents the mean difference between pathlengths of beams 122, 124 prior to the displacement of the body 129 that is to be measured, this mean difference being, of course, an exact multiple of one-half wavelength of the light used. Vibration of mirror 134 along the path of beam 124 will alternately increase and decrease the difference between pathlengths of beams 122, 124, the minimal difference being represented at point $l'$ and the maximum at point $m'$. After surface 127 has been displaced, the mean difference between pathlengths of beams 122, 124 will be changed to, for example, point $n'$.

Figure 6:
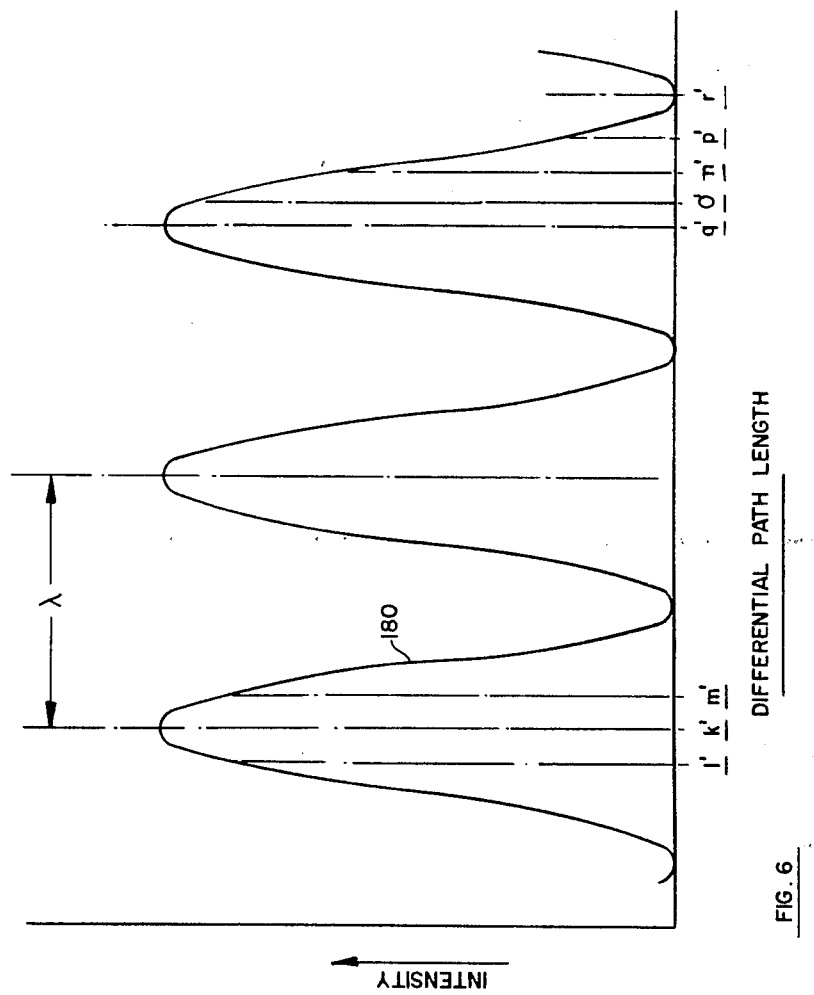

Vibration of mirror 134 will now vary the difference between pathlengths of beams 122, 124 between points $o'$ and $p'$, and the frequency of intensity fluctuation of beam 156 will be the same as the frequency of the driving signal impressed upon transducer 136. No second harmonic appears in the output. The bias voltage is adjusted to return the frequency of intensity fluctuation of beam 156 to the condition that existed prior to displacement of surface 127, namely, a condition in which the fundamental is absent and the difference between pathlengths of beams 122, 124 is a multiple of one-half wavelength of light. Such a condition can be attained at either of the points $q'$ or $r'$. As previously mentioned, if the initial operating point is selected at a point of maximum intensity, the displacement is determined by restoring the operating point to a second point of maximum intensity. Obviously, the bias voltage can be adjusted so that the condition of minimum fundamental is obtained at a point of minimum intensity, such as point $r'$ in FIG. 6. However, if this is done, it will be readily observable that the condition is not the same as the initial condition, since the intensity of beam 156 will be minimal rather than maximal. In the situation illustrated in FIG. 6, the total displacement can be calculated if the wavelength of light used in the interferometer is known. Manifestly, this displacement will be equal to the displacement required to restore the system to the same condition that existed prior to the displacement of the body 129, namely, $d=K\Delta V$, as previously explained, plus one wavelength of the light used. It must be remembered that a displacement of body 129 equal to a half wavelength of light will change the difference between pathlengths of beams 122, 124 by a wavelength of light. Therefore, adjacent maximum points in FIG. 6 represent a displacement of body 129 equal to only a half wavelength of light. Although it is most convenient to determine displacement by restoring the system to the same operating condition that existed prior to displacement of the body 129, it is, of course, also possible to determine displacement by adjusting the system so that a symmetrical second harmonic without fundamental is obtained at an intensity point that is not analogus to the point of initial operation. In FIG. 6, this procedure would be illustrated by an adjustment of bias voltage, after displacement of the body 129 has occurred, to point $r'$ rather than point $q'$. In this case, the total displacement will be one and a quarter wavelengths of the light used, minus $d=K\Delta V$. Measurement of a displacement of body 129 that exceeds one-quarter of a wavelength of light can readily be carried out by adjusting the operating point of the system on either a point of maximum or minimum intensity and then observing the number of times that the intensity of beam 156 passes through points of minimum and maximum intensity. The displacement of body 129 that causes the intensity of beam 156 to vary from a maximum intensity to minimum intensity, and vice versa, is, of course, equal to one-quarter wavelength of light. Displacement of body 129 that is a fraction of one-quarter wavelength can be determined by the aforementioned adjustment of bias voltage to restore the initial operating condition and application of the $d=K\Delta V$ equation, and this fraction can be combined with the number of one-quarter or one-half wavelengths of displacement to provide the total displacement with a high degree of accuracy.

The principle advantages of the above-described adaption of the invention for measurement of small displacements are the extreme accuracy of measurement and the simplicity of operation of the system. A device constructed in accordance with the principles of this invention, as illustrated in FIG. 4, has detected a displacement as small as $\frac{1}{24,000}$ of a wavelength of light. It will be obvious to persons skilled in the art that an increase of measuring precision of the magnitude provided by the invention can be utilized in numerous ways.

Figure 7:
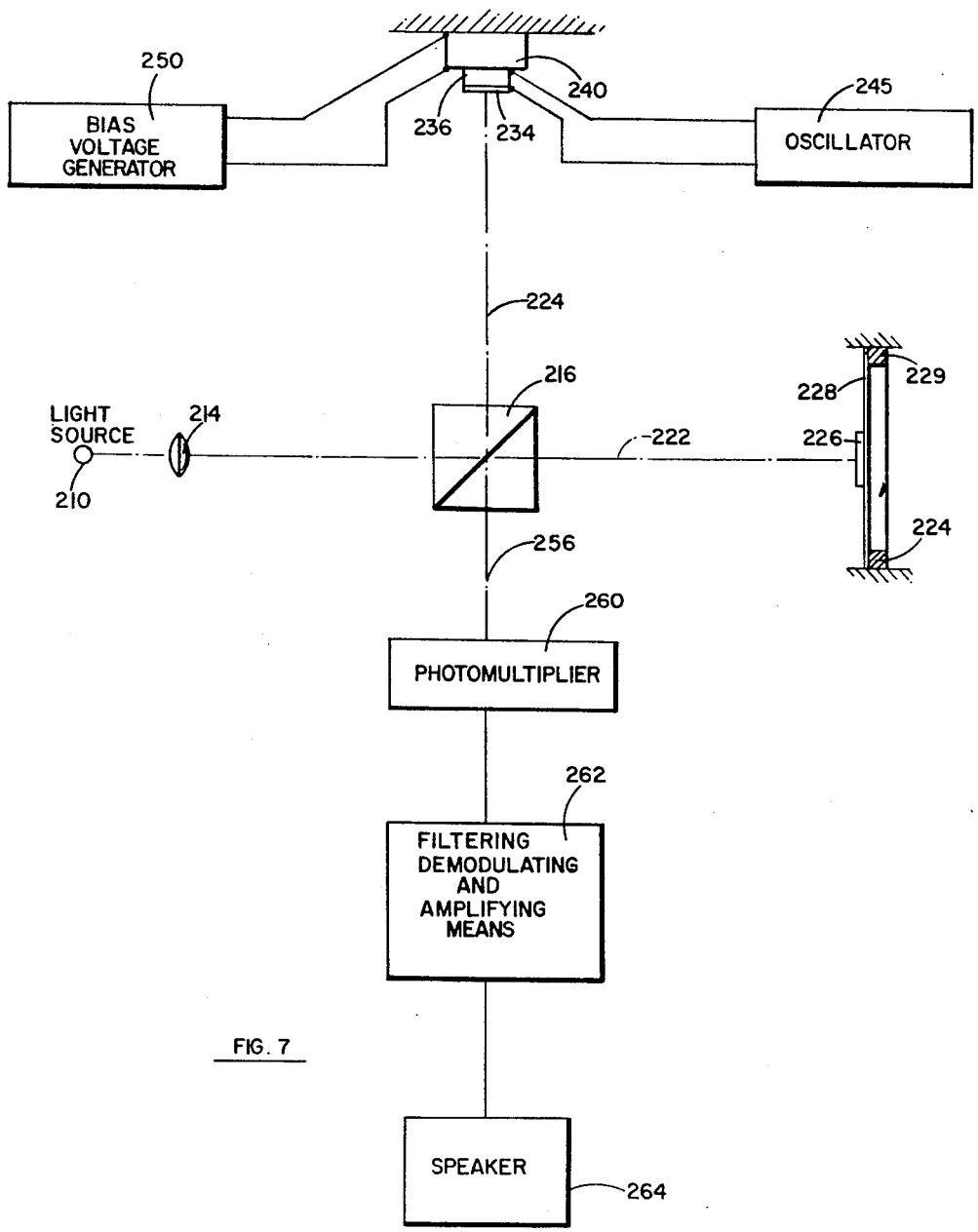
FIG. 7 is a schematic representation of a fourth embodiment of the invention adapted for use in detecting displacement of a body induced by an external force of varying magnitude.

The invention is also useful for detection of displacements, finding application in sensing various conditions manifested by displacement due to forces of gravity, inertia (acceleration), magnetisms, shock, pressure, and vibrations. Used to detect vibrational pressure of sound waves the invention provides a highly sensitive microphone as shown in FIG. 7. The construction and materials of this embodiment are basically the same as those of the displacement measuring device described above and shown in FIG. 4. Light from a monochromatic light source 210 passes through a collimating lens 214 to a beam-splitter, generally designated at 216, that splits the light into two beams 222, 224. These beams pass respectively to two reflecting mirrors 226, 234 and recombine at the beam-splitter to form an output beam 256, the intensity of which depends upon the relative effective pathlengths of the split beams. The arrangement of the reflecting mirror in one leg of the interferometric system is identical to that of the measuring embodiment, namely, mirror 234 can be displaced along the path of beam 224 by means of either or both vibration of a transducer 236 driven by an oscillator 245, and movement of a bias transducer 240 actuated by a D.-C. bias voltage generator 250. However, in the other leg of the system the reflecting mirror 226 is mounted for oscillation along the path of beam 222 rather than for displacement only as in the case of mirror 126 for the displacement measuring embodiment shown in FIG. 3. As illustrated in FIG. 7, mirror 226 is a thin silvered glass plate attached to one surface of a resilient diaphram 228 that is itself bonded at its periphery to a fixed support ring 229. The diaphram 228 is a thin sheet of plastic material, such as, for example, a film of polythylene terephthalate, commercially available as Mylar, that will vibrate when struck by sound waves. Obviously many other arrangements may be employed to effect oscillatory motion of a reflective surface in response to compressioned wave energy. The intensity fluctuation of the output beam 256 is detected by a photomultiplier 260 that generates an electrical output proportional thereto. As will be described in detail below, the intensity of beam 256 is modulated by the oscillation of mirror 226 induced by sound waves which strike the diaphram 228. By means of conventional filtering, demodulating and amplifying apparatus 262 and an output device such as a recorder or speaker 264, the electrical signal from the photomultiplier can be demodulated to produce highly amplified sound waves corresponding to the detected sound waves.

Figure 8:
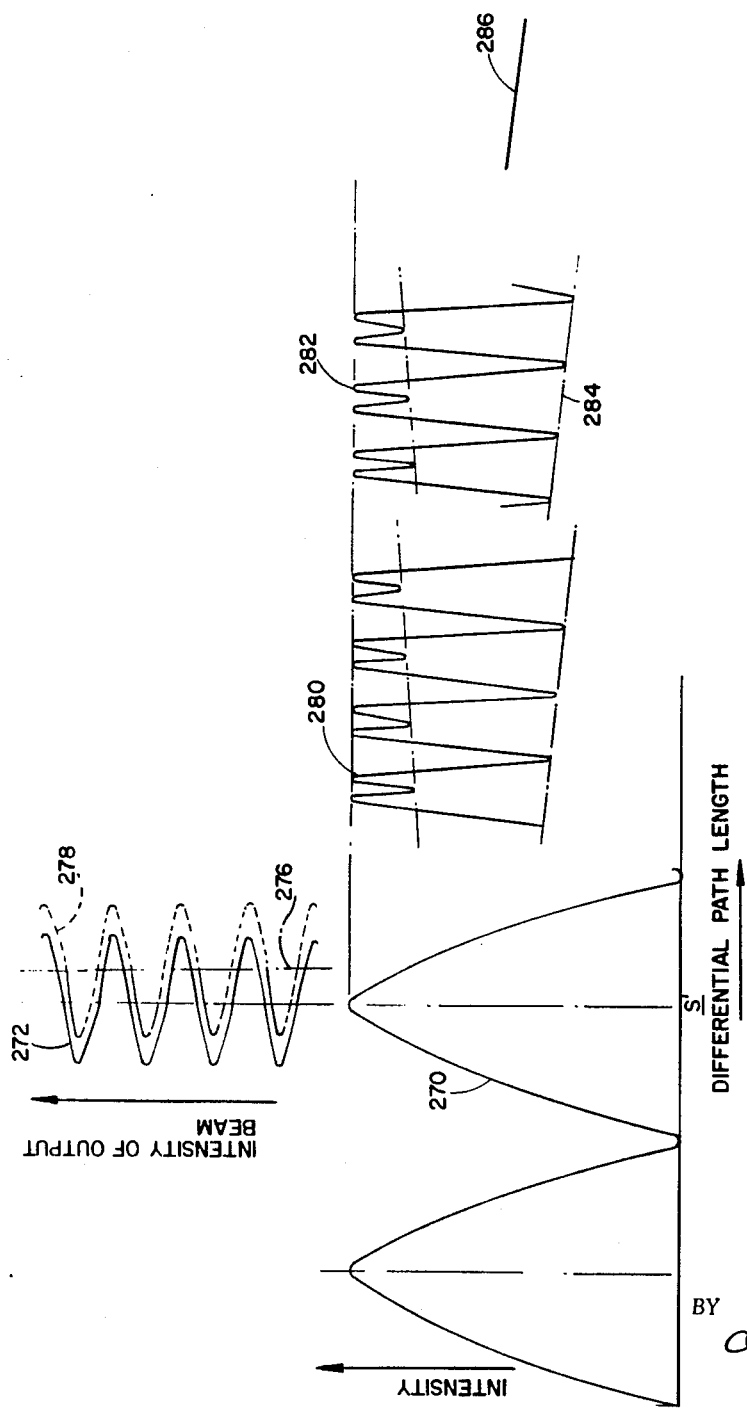
FIG. 8 is a graph illustrating operative features of the embodiment of the invention shown in FIG. 7.

The operation of the sound-detecting embodiment of the invention can best be understood by reference to FIG. 8, in which curve 270 represents a graph of the variation of intensity of beam 256 associated with variation of the difference between pathlengths of beams 222, 224. Also included in FIG. 8 are curves representing in schematic form the time, frequency and amplitude relationship of the following signals: the input signals that cause an intensity fluctuation in the beam 256; the intensity fluctuation of beam 256; and the electrical signals at points in the electronic detecting circuitry. It will be understood from the foregoing description that the bias voltage impressed upon the bias transducer 240 by means of the bias voltage generator 250 can be adjusted so that the vibration of transducer 236 in response to the signal from the oscillator 245 will vary the difference between the pathlengths of beams 222, 224 between two points on curve 270 which are equally displaced from a maximum point of the curve (abscissa, point $s'$). A variation in pathlengths of beams 222, 224 that represents such an adjustment of the bias voltage and impressed oscillatory signal from oscillator 245 is designated in FIG. 8 as curve 272. This is the carrier signal impressed upon transducer 236. Curve 276 represents a portion of a sound wave impinging upon the diaphram 228, the slope of the curve representing a variation of the amplitude of the wave with time. It will be recognized that the transducer 236 oscillation frequency (i.e., the carrier frequency) should be high compared to audio frequencies to be detected by the system. For both curves 272 and 276 (the latter representing a sound wave) time is plotted vertically and amplitude horizontally in FIG. 8. The displacement of diaphram 228 (and mirror 226) induced by the detected sound wave will obviously also change the difference between the pathlengths of beams 222, 224. A variation in pathlengths of beams 222, 224 that represents the effect of displacement of the diaphram 228 caused by the detected sound waves is assumed to identically copy the input sound wave variation and is designated by the same curve 276. The combined effect of the displacements of both mirrors 226, 234 produces a resultant variation in pathlengths of beams 222, 224 that is designated as curve 278. This resultant variation in pathlengths of beams 222, 224 will in turn cause an intensity fluctuation in beam 256 that is represented by curve 280. The photomultiplier output voltage, designated as curve 282, will correspond to the intensity fluctuation of beam 256. If the resultant variation in pathlentghs of beams 222, 224 (curve 278) is such that the minimal and maximal differences between pathlengths are respectively less and greater than the difference represented at point $s'$ (but between adjacent minimum points of the curve), the signal detected by the photomultiplier will have a frequency component twice that of the signal impressed upon transducer 236 by means of the oscillator 245. It will be recognized that the envelope 284 of curve 282 corresponds to the sound wave 276. By means of the filtering, demodulating and amplifying apparatus 262, an electrical signal 286 corresponding to the original sound wave can be obtained. This signal is used to actuate the output device 264.

It will be appreciated that the displacement of diaphram 228 that can be detected by means of the described system is very small. The displacement of diaphram must, in fact, be less than a *displacement which, combined with* the displacement of mirror 234 resulting from the signal from oscillator 245, will cause the variation of the difference between pathlengths of beams 222, 224 to exceed one-half of a wavelength of the light used. Since the construction and material used for the diaphram 228 can be selected so that a very weak sound wave will be capable of moving the diaphram a distance of detectable magnitude, the described embodiment provides a microphone or sound detector of great sensitivity.

Although the embodiment of the invention shown in FIG. 7 has been described with reference to a sound detecting system, it will be obvious that it can also be used to advantage, with slight modification, for detecting any force that will cause a displacement of mirror 226 which varies with time. The principles of the invention can be applied, for example, to produce a super-sensitive strain-gauge, gravitometer, seismograph or servo-mechanism. If mirror 226 is attached to a body that is to be maintained in or driven to a predetermined position, the movement of such surface will, combined with the vibratory motion of mirror 234 under the influence of the signal from the oscillator 245, change the relative effective pathlengths of beams 222, 224. By means of the bias transducer 240 and bias voltage generator 250 the system can be operated so that when the aforementioned body is in its desired position, the vibration of mirror 234 will vary the difference between pathlengths of beams 222, 224 about a peak of curve 270 of FIG. 8. When the controlled body moves, the pattern of intensity fluctuation of beam 256 will change, and the shape of curve 280 with respect to the amplitudes of adjacent minimum points will depend upon the magnitude of the displacement of mirror 226. By use of a feed-back circuit and known electronic apparatus capable of detecting the amplitude, phase and frequency of the electrical signal generated by the photomultiplier 260, the direction and extent of displacement of mirror 226 can be determined and automatic corrections made to return the body to which the mirror is attached to its proper position.

Figure 9:
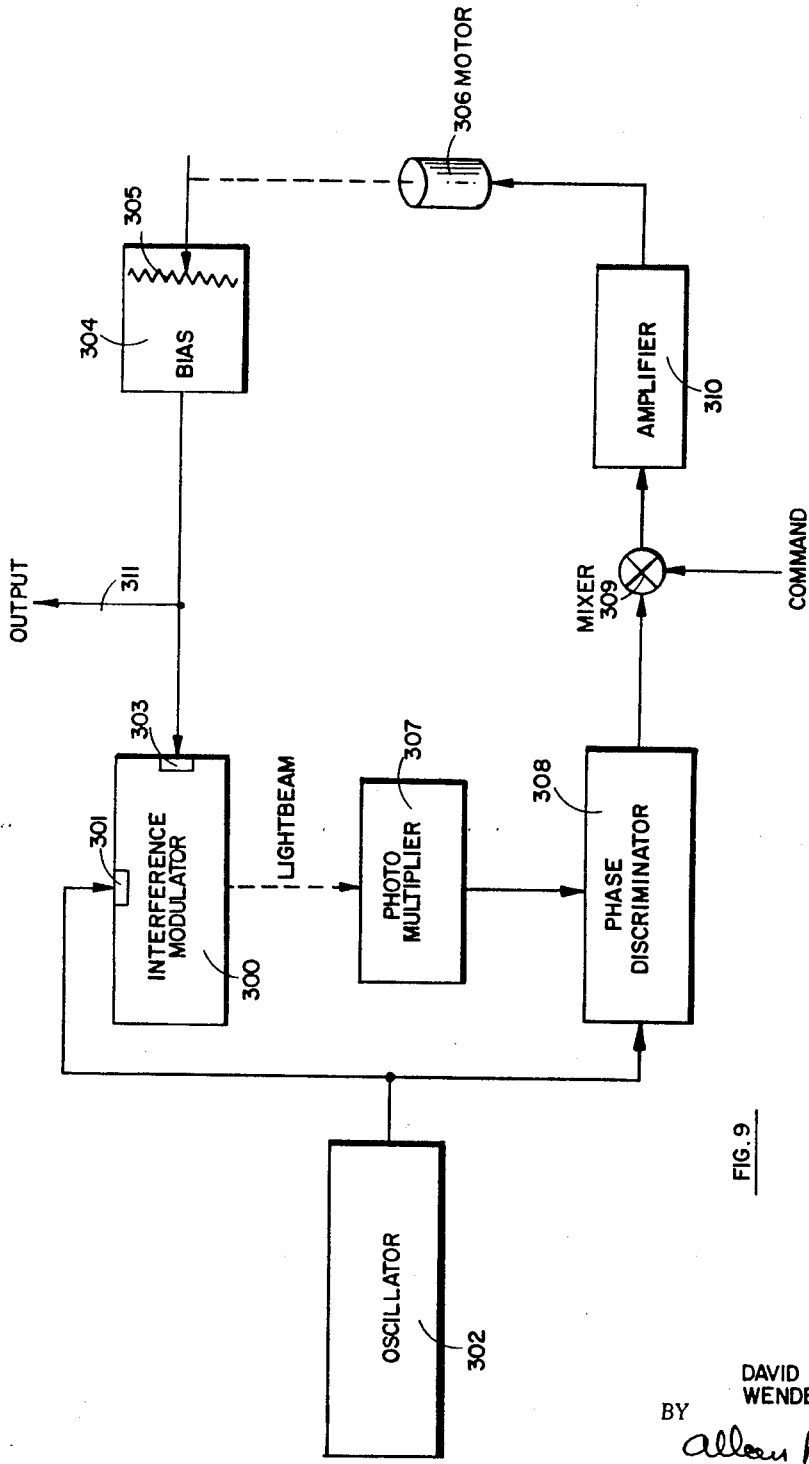
FIG. 9 illustrates a servo arrangement employing principles of the invention.

A closed loop servo arrangement is illustrated in FIG. 9 as including an interference modulator 300 substantially similar to those previously described and operating upon an input light source not shown in this figure. The modulator includes a mirror carried by a first transducer 301 that is driven at a fundamental frequency by the output of an oscillator 302 that provides a sinusoidal fundamental signal of 6 kilocycles per second for example. In a second leg of the modulator a second mirror is mounted upon a bias transducer 303 that is driven from a D.–C. bias source 304 including a variable potentiometer 305 operatively connected for adjustment by a reversible motor 306.

The modulator output beam is fed to a photomultiplier device 307 producing an electrical signal that is fed as a first input to a phase discriminator 308 having a second signal input in the form of a reference signal from the oscillator 302. The phase discriminator in effect detects the sense and magnitude of input signal components of fundamental frequency. The discriminator provides an output having polarity depending upon the phase relation between the reference frequency from oscillator 302 and the fundamental contained in the output of the photomultiplier 307. The phase discriminator output is fed through a summing device 309 where it is summed with a command signal representing a desired displacement. The sum is fed as an error signal to an amplifier 310 which drives motor 306.

When the displacement of the mirror or free surface of bias transducer 303 is at a predetermined value represented by the commanded input to the summing device 309 the fundamental (6 kilocycles) component of the photomultiplier output will have a magnitude such that the error output of summing device 309 is substantially zero whereby the bias signal provided to bias transducer 303 will remain invariant. This bias signal, provided as an output on lead 311, will indicate the amount of displacement of the surface of the bias transducer. In the absence of any command signal input to summing device 309 this servo arrangement will operate to displace the surface of the bias transducer 303 so that the oscillating transducer 301 will oscillate about a half wave length operating point. With reference to the curve 170 of FIG. 5, for example, the transducer 301 will oscillate about a maximum or minimum.

When the arrangement of FIG. 9 is used as a device for measurement of a condition or displacement, no command signal is employed and the operating point is automatically set at a maximum or minimum since this servo seeks a position of the bias transducer 303 wherein there is zero component of the fundamental of the oscillator frequency in the output of the photomultiplier. Then, upon occurrence of some condition that will create a change in effective differential path length the servo will again operate to provide a null in the component of fundamental of the output by varying the D.-C. bias whereby the bias output as indicated at lead 311 will provide a measure of the change in path length that has taken place.

It will be seen that there have been described a number of embodiments of interferometry methods and apparatus that require little power, are of small size and weight and capable of numerous applications such as ultra-sensitive measurement, information transmission and condition sensing.

Although the invention has been described and illustrated in detail, it is to be clearly understood that the same is by way of illustration and example only and is not to be taken by way of limitation, the spirit and scope of this invention being limited only by the terms of the appended claims.

What is claimed is:

1. An optical modulation system comprising:
   a source of substantially monochromatic light,
   a first lens for focusing light from said source,
   a beam-splitter for splitting light from said first lens into two focused beam portions,
   a pair of mirrors each positioned to intercept a respective one of said beam portions at the focus thereof,
   a source of modulation signal,
   means responsive to said modulation signal for effecting mutually opposite sense oscillatory motion of said mirrors along the paths of said beam portions,
   a second lens for collimating the modulated light beam formed by the recombination of said focused beam portions at said beam-splitter and means for continuously causing the oscillatory motion of said mirrors to operate about a selected portion of the curve relating interference with relative path lengths so that maximum linearity is obtained in the relation between light amplitude and amplitude of the modulation signal.

2. A system for varying the intensity of a beam of light comprising:
   a source of substantially monochromatic light,
   a beam-splitter for splitting light from said light source into two beam portions,
   a pair of mirrors each positioned to intercept a respective one of said beam portions,
   first electro-mechanical transducer means for effecting a repetitively varying displacement of one of the mirrors,
   signal generator means for applying a varying electrical signal to said first electro-mechanical transducer means,
   second electro-mechanical transducer means for effecting a controlled steady state displacement of one of said mirrors in response to a bias signal and
   bias generator means for applying a bias electrical signal to said second electro-mechanical transducer means for continuously adjusting the pathlength between said beam-splitter and said mirror so that the pathlength difference between the two beam portions is maintained in a predetermined range independent from external perturbations.

3. An optical modulation system comprising:
   a source of substantially monochromatic light,
   a first lens for focusing light from said source,
   a beam-splitter for splitting light from said first lens into two focused beam portions,
   a pair of mirrors each positioned to intercept a respective one of said focused beam portions at the focus thereof,
   a source of modulation signal,
   means responsive to said modulating signal for effecting oscillatory motion of one of said mirrors,
   a source of bias control signal, and
   means responsive to said bias control signal for continuouosly controlling the points between which said one mirror oscillates whereby the amplitude of light recombined by said beam-splitter bears a selected relation to the amplitude of the modulation signal.

4. Apparatus of the class described comprising:
   a source of energy of a given wavelength,
   means for directing said energy along first and second paths,
   a support,
   an oscillatory transducer carried by said support,
   a reflective surface carried by the oscillatory transducer and positioned in the first path,
   a second reflective surface mounted to a support for motion along the second path,
   an electromechanical bias transducer interposed between said oscillatory transducer and its respective support for continuous controlled steady state adjustment of the reflective surface carried by the oscillatory transducer for varying the relative lengths of the first and second paths to a mean value that is an integral multiple of one-quarter of the wavelength in response to an electrical signal, and
   means for recombining energy from said paths.

5. The apparatus of claim 4 including a second oscillatory transducer, said second reflective surface being carried by said second oscillatory transducer,
   said first and second oscillatory transducers being oppositely polarized piezoelectric transducers, and
   a modulation signal generator electrically connected to both of said transducers so that application of one signal to both of said transducers effects motions thereof in mutually opposite sense.

6. The apparatus of claim 4 wherein said second reflective surface is adapted to be displaced through a distance that is to be measured, and including
   means for effecting vibration of said oscillatory transducer at a predetermined frequency, and
   means for driving said bias transducer to create a difference in length of said paths of an integral multiple of a one-half wavelength of said energy.

7. The apparatus of claim 4 wherein said second reflective surface is mounted for displacement in response to a condition to be measured, and including
   means for driving said oscillatory transducer at a carrier frequency,
   means for driving the bias transducer to create a difference in length of said paths of an integral multiple of one-half wavelength of said energy,
   a detector responsive to said recombining means,
   a filter for passing said carrier frequency, and
   demodulating means responsive to the filter.

8. A communication system comprising an electromagnetic energy generator, a modulator, a source of information signal, a detector, said modulator comprising:
   means for directing an energy beam from said generator along first and second paths,
   first electro-mechanical transducer means responsive to said source for changing the length of one of said paths according to said information signal,
   second electro-mechanical transducer means for effecting a controlled steady state adjustment of the relative lengths of said paths so that the relative lengths of said first and second paths are adjusted for optimal modulation of said energy beam, and
   means for combining energy from said paths.

9. An optical modulation system comprising:
   a source of substantially monochromatic light, a first lens for focusing light from said source,
a beam-splitter for splitting light from said first lens into first and second beam portions,
a first support member,
a first resilient mounting member having one face secured to said first support member,
a first solid-state electromechanical transducer having one face mounted on said first mounting member and a second face free to move along the optical path of said first beam portion,
a first mirror mounted on said second face of said first transducer,
a second support member,
a second solid-state electromechanical transducer having one face mounted on said second support member and a second face free to move along the optical path of said second beam portion,
a second resilient mounting member having one face secured to said second face of said second transducer,
a third solid-state electromechanical transducer having one face mounted on said second mounting member and a second face free to move along the optical path of said second beam portion, the direction of polarization of said third transducer with respect to said second beam portion being opposite the direction of polarization of said first transducer with respect to said first beam portion,
a second mirror mounted on said second face of said third transducer,
a modulation signal generator,
means for amplifying and impressing the signal from said modulation signal generator across respective first and second faces of said first and third transducers in the same phase relation,
a bias voltage generator,
means for impressing the voltage from said bias voltage generator across the first and second faces of said second transducer,
a second lens for collimating the light formed by recombination of said beam portions at said beam-splitter, and
means for detecting the variation of intensity of light from said second lens.

10. A source of radiant energy,
means for directing an energy beam from said source along first and second paths,
first transducer means for effecting a controlled steady state variation of differential length of said paths,
second transducer means connected to said first transducer means for effecting fluctuating variation of such differential length,
means for driving said first transducer means with a bias signal for continuously adjusting the differential length to a mean value that is an integral multiple of one-quarter of the wavelength of the radiant energy,
means for driving said second transducer means with a fluctuating electrical signal, and
means for combining portions of said beam from said paths.

11. The structure of claim 10 wherein said fluctuating electrical signal component has a predetermined frequency, and including means for effecting a change in differential path length in accordance with a condition to be sensed.

12. The structure of claim 10 including means responsive to said combined beam portions for controlling said means for driving said transducer means.

13. The method of measuring displacement with a split path interferometer employing an energy beam of a given wavelength comprising the steps of:
effecting oscillatory variation of difference in lengths of said split paths about a path length difference that is substantially an integral multiple of one-half wavelength of the energy beam,
varying the difference in path length by an amount to be measured, and
further varying the difference in path length by a known amount to again effect oscillatory variation of difference in lengths of said paths about a path length difference of a substantially integral multiple of one-half wave length of the energy beam.

14. In a method of measuring displacement by detecting the output beam of an interferometer having a beam-splitter and reflecting mirrors, the improvement comprising:
vibrating one of said mirrors at a predetermined frequency,
displacing one of said mirrors to cause the intensity of the beam to vary at a frequency that is a second harmonic of said predetermined frequency,
moving one of the mirrors by an amount to be measured, and
indicating the displacement of one of the mirrors required to again cause the intensity of the beam to vary at said second harmonic.

15. In a method of measuring displacement by detecting the output beam of an interferometer having a beam-splitter and two reflecting mirrors, the improvement comprising:
vibrating one of said mirrors at a predetermined frequency,
effecting the displacement of one of said mirrors to obtain a minimum component of change of intensity of said output beam at said frequency,
displacing one of the mirrors by an amount to be measured, and
displacing one of the mirrors to obtain minimum component of change of intensity of the output beam at said frequency.

16. A system for measuring displacement by detecting the variation of intensity of a light beam comprising:
a source of substantially monochromatic light,
a beam-splitter for splitting light from said source into first and second beam portions,
a first mirror mounted on a surface whose displacement is to be measured and positioned in the optical path of said first beam portion,
a support member,
a first solid-state electromechanical transducer having one face mounted on said support member and a second face free to move along the optical path of said second beam portion,
a second solid-state electromechanical transducer having one face mounted on said second face of said first transducer and a second face free to move along the optical path of the said second beam portions,
a second mirror mounted on said second face of said second transducer,
a bias voltage generator,
means for impressing the output voltage of said bias voltage generator across the faces of said first transducer,
an oscillator,
means for impressing the signal from said oscillator across the faces of said second transducer, and
means for detecting the variation of intensity of light emerging from said beam-splitter.

17. Sound-detecting apparatus comprising:
a source of substantially monochromatic light,
a beam-splitter for splitting light from said source into first and second beam portions,
a first support member,
a diaphragm resiliently mounted on said first support member so as to move along the optical path of said first beam portion when struck by sound waves,
a first mirror mounted on said diaphragm and positioned in the optical path of said first beam portion,
a second support member, a first solid-state electromechanical transducer having one face mounted on said second support member and a second face free to move along the optical path of said second beam portion, a second solid-state electromechanical transducer having one face mounted on said second face of said first transducer and a second face free to move along the optical path of said second beam portion, a second mirror mounted on said second face of said second transducer, a bias voltage generator, means for impressing the output voltage of said bias voltage generator across the faces of said first transducer for causing the second transducer to operate about a selected portion of a curve relating light intensity after interference with relative pathlength in an interferometer, a carrier signal generator, means for impressing the signal from said carrier signal generator across the faces of said second transducer, detecting means responsive to the intensity of light emerging from said beam-splitter for producing an electrical output signal, a filter responsive to said detecting means for passing the frequency of said carrier, and a demodulator responsive to the filter.

18. Condition sensing apparatus comprising:
a source of energy of predetermined wavelength,
means for providing first and second paths for energy from said source,
bias means for adjusting difference in lengths of said paths to an integral multiple of one-half wavelength of said energy,
carrier means for effecting a repetitive differential variation of the lengths of said paths at a predetermined frequency,
condition responsive means for differentially varying the lengths of said paths, and
means responsive to energy combined from said paths for attenuating a harmonic of said frequency.

19. Apparatus of the class described comprising:
a source of energy of predetermined wavelength,
means for providing first and second paths for energy from said source,
bias means for adjusting difference in lengths of said paths to an integral multiple of one-half wavelength of said energy,
carrier means for effecting a repetitive differential variation of the lengths of said paths at a predetermined frequency,
means for detecting energy combined from said paths,
a phase discriminator responsive to said detection means and referenced from said carrier means, and
means responsive to the discriminator for controlling the bias means.

20. An optical modulation system as defined in claim 1 wherein said means responsive to said modulation signal comprises first and second electromechanical transducers electrically connected for effecting mutually opposite sense oscillatory motion; and wherein said means for causing the motion of said mirrors to operate about a selected portion of the curve relating interference with path length comprises:

a third electromechanical transducer for supporting said first transducer; and
a source of bias signal electrically connected to said third transducer.

21. An optical modulation system comprising:
a source of substantially monochromatic light;
a beam-splitter for splitting light from said source into first and second beam portions;
a first support member;
a first piezoelectric transducer having one face connected to said first support member and a second face free to move along the optical path of said first beam portion;
a first mirror mounted on said second face of said first transducer;
a second support member;
a second piezoelectric transducer having one face connected to said second support member and a second face free to move along the optical path of said second beam portion;
a third piezoelectric transducer having one face connected to said second face of said second transducer and a second face free to move along the optical path of said second beam portion;
a second mirror mounted on said second face of said third transducer;
a modulation signal generator;
means for impressing the signal from said modulation signal generator across respective first and second faces of said first and third transducers;
a bias voltage generator; and
means for impressing the voltage from said bias voltage generator across the first and second faces of said second transducer.

22. An optical modulation system as defined in claim 21 wherein the direction of polarization of said third transducer with respect to said second beam portion being opposite the direction of polarization of said first transducer with respect to said first beam portion and wherein;
the signal from said modulation signal generator is impressed across respective first and second faces of said first and third transducers in the same phase relation.

References Cited by the Examiner

UNITED STATES PATENTS

| 2,385,086 | 9/1945 | D'Agostino et al. | 88—61 X |
| 2,583,596 | 1/1952 | Root | 88—141 |
| 3,175,088 | 3/1965 | Herriott | 250—199 |
| 3,186,294 | 6/1965 | Woodson | 88—14 |
| 3,202,052 | 8/1965 | Rambauske et al. | 88—61 |

FOREIGN PATENTS

| 608,711 | 3/1962 | Belgium. |
| 1,030,059 | 5/1958 | Germany. |
| 1,085,350 | 7/1960 | Germany. |
| 122,552 | 2/1958 | Russia. |

DAVID G. REDINBAUGH, *Primary Examiner.*

JOHN W. CALDWELL, *Examiner.*